(12) United States Patent
Sääskilahti et al.

(10) Patent No.: US 12,666,249 B2
(45) Date of Patent: Jun. 23, 2026

(54) ORDERING AND CREATING A SUBSCRIPTION PROFILE FOR A SUBSCRIBER ENTITY

(71) Applicant: Telefonaktiebolaget LM Ericsson (publ), Stockholm (SE)

(72) Inventors: Juha Sääskilahti, Espoo (FI); Mia Meinander, Espoo (FI); Petri Mikkilä, Espoo (FI); Abu Shohel Ahmed, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 385 days.

(21) Appl. No.: 18/013,335

(22) PCT Filed: Jul. 1, 2020

(86) PCT No.: PCT/EP2020/068529
§ 371 (c)(1),
(2) Date: Dec. 28, 2022

(87) PCT Pub. No.: WO2022/002388
PCT Pub. Date: Jan. 6, 2022

(65) Prior Publication Data
US 2023/0239681 A1 Jul. 27, 2023

(51) Int. Cl.
*H04W 8/20* (2009.01)

(52) U.S. Cl.
CPC ................................... *H04W 8/205* (2013.01)

(58) Field of Classification Search
CPC ................................................... H04W 8/205
See application file for complete search history.

(56) References Cited

U.S. PATENT DOCUMENTS

| | | | | |
|---|---|---|---|---|
| 10,530,756 B1* | 1/2020 | Youngs | ................. | H04W 12/08 |
| 10,911,945 B1* | 2/2021 | Youngs | ................... | H04W 4/60 |
| 2017/0338962 A1* | 11/2017 | Li | ........................... | H04L 69/326 |
| 2018/0123803 A1* | 5/2018 | Park | ......................... | H04L 9/14 |
| 2019/0124616 A1* | 4/2019 | Khan | ................... | H04W 8/205 |
| 2019/0373448 A1* | 12/2019 | Gao | .................... | H04W 12/062 |
| 2020/0045544 A1 | 2/2020 | Yu et al. | | |

(Continued)

FOREIGN PATENT DOCUMENTS

| | | |
|---|---|---|
| EP | 3277000 A1 | 1/2018 |
| EP | 3582527 A1 | 12/2019 |
| WO | 2019015793 A1 | 1/2019 |

(Continued)

OTHER PUBLICATIONS

Notice of Reasons for Rejection for Japanese Patent Application No. 2022-580367 dated Jan. 16, 2024, 4 pages.

(Continued)

*Primary Examiner* — Barry W Taylor
(74) *Attorney, Agent, or Firm* — Sage Patent Group

(57) ABSTRACT

There is provided mechanisms for creating a subscription profile for a subscriber entity. A method is performed by a subscription provisioning server. The method comprises obtaining, from the subscriber entity, a request for download of the subscription profile. The request comprises capability information of the subscriber entity. The method comprises creating the subscription profile based on the capability information as obtained from the subscriber entity.

20 Claims, 8 Drawing Sheets

(56) References Cited

U.S. PATENT DOCUMENTS

2020/0186992 A1 *  6/2020  Bas Sanchez ........ H04W 8/20
2021/0368329 A1 * 11/2021  Wimbock ............. H04W 4/50

FOREIGN PATENT DOCUMENTS

WO      2019120609  A1    6/2019
WO      2020/035150  A1    2/2020

OTHER PUBLICATIONS

International Search Report and Written Opinion for International
Patent Application No. PCT/EP2020/068529, mailed Mar. 4, 2021,
22 pages.
GSM Association, et al. "SGP.22 RSP Technical Specification,
Version 2.2.2," GSM Association Non-confidential Official Docu-
ment, Jun. 5, 2020, 268 pages.
Simalliance, et al. "eUICC Profile Package: Interoperable Format
Test Specification Version 1.0," SIMalliance ltd., 2016, 70 pages.

* cited by examiner

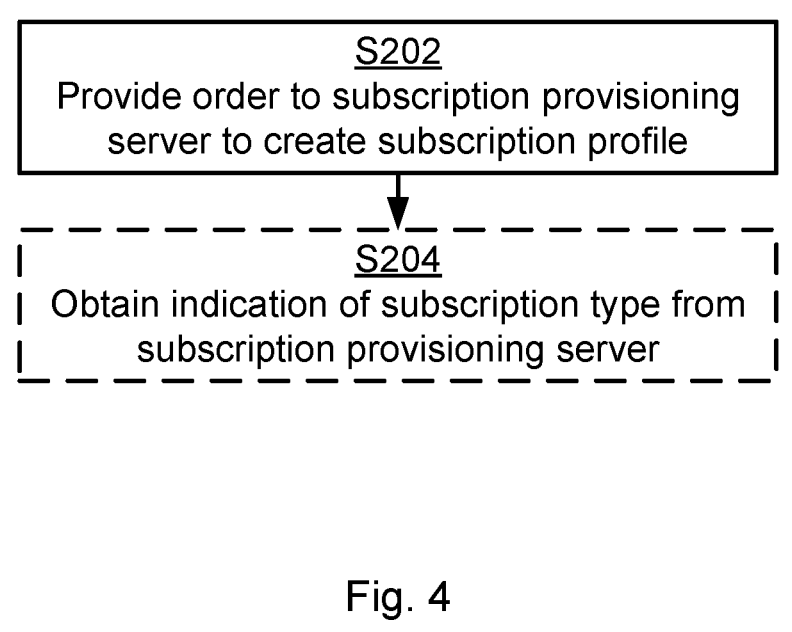

S202
Provide order to subscription provisioning
server to create subscription profile S204
Obtain indication of subscription type from
subscription provisioning server

Fig. 4

ORDERING AND CREATING A SUBSCRIPTION PROFILE FOR A SUBSCRIBER ENTITY

CROSS REFERENCE TO RELATED APPLICATIONS

This application is a 35 U.S.C. § 371 national stage application of PCT International Application No. PCT/EP2020/068529 filed on Jul. 1, 2020, the disclosure and content of which is incorporated by reference herein in its entirety.

TECHNICAL FIELD

Embodiments presented herein relate to a method, a subscription provisioning server, a computer program, and a computer program product for creating a subscription profile for a subscriber entity. Embodiments presented herein further relate to a method, a mobile network operator entity, a computer program, and a computer program product for ordering a subscription profile for a subscriber entity.

BACKGROUND

Remote SIM provisioning (RSP; where SIM is short for subscriber identity module) for consumer devices is described in "SGP.22—RSP Technical Specification", Version 2.2.2, 5 Jun. 2020, published by the GSM Association. According to this document, firstly, the subscriber makes a contract with a mobile network operator (MNO). Secondly, the MNO orders a profile for the subscriber entity from a server (enhanced Subscription Manager Data Preparation (SM-DP+) server), and the SM-DP+ creates the profile and returns to the MNO a pointer to the profile. Thirdly, the MNO delivers the pointer for download initialization of the profile to the subscriber. Fourthly, the profile is downloaded from the SM-DP+ to the embedded universal integrated circuit card (eUICC) in the communication device to be provisioned. Section 3.1 of the aforementioned document describes the profile download initiation process. It indicates how the user orders a subscription from the MNO. Request/response methods are used for the MNO to request the SM-DP+ to create a SIM profile. The profile is then stored securely in the SM-DP+. After profile creation, the subscriber entity can download the created profile by contacting the SM-DP+ using the communication device.

In general terms, the profile is a data package that contains MNO specific parameters and credentials that allow the communication device to access the network of the MNO after download of the profile. The structure of the data package may follow either a standardized or a proprietary format. The profile is prepared and created for an eUICC upon the SM-DP+ receives the profile order from the MNO. The MNO may know the capabilities of the eUICC at the profile order time or the MNO may order the SM-DP+ to create a generic profile without having access to information of the eUICC capabilities. The latter could represent a scenario where a batch of profiles is ordered for prepaid subscriptions, where the target communication devices are not be known in advance.

An MNO without knowing the capabilities of the eUICC may thereby order an incompatible profile from the SM-DP+. The capabilities of an eUICC may differ from one eUICC to another eUICC. For example, there are different versions of the GSMA specifications, there are different versions of the eUICC, and there are different versions of the specified profile package formats. All of these factors may impact the profile content. Thus, one profile type may not be suitable for all communication devices. The same applies not only to prepaid subscriptions, but for all subscriptions. When an MNO sells a subscription, the MNO will need to ask from the subscriber the make, model, age of the communication device in order to allocate the correct profile type. This manual process is error prone, and subscribers might provide incorrect information to the MNO by accident or by purpose.

Hence, there is still a need for improved handling of subscription profiles for eUICCs and other types of subscriber entities.

SUMMARY

An object of embodiments herein is to provide less complex creation of subscription profiles that in turn enables efficient handling of subscription profiles for eUICCs and other types of subscriber entities.

According to a first aspect there is presented a method for creating a subscription profile for a subscriber entity. The method is performed by a subscription provisioning server. The method comprises obtaining, from the subscriber entity, a request for download of the subscription profile. The request comprises capability information of the subscriber entity. The method comprises creating the subscription profile based on the capability information as obtained from the subscriber entity.

According to a second aspect there is presented a subscription provisioning server for creating a subscription profile for a subscriber entity. The subscription provisioning server comprises processing circuitry. The processing circuitry is configured to cause the subscription provisioning server to obtain, from the subscriber entity, a request for download of the subscription profile. The request comprises capability information of the subscriber entity. The processing circuitry is configured to cause the subscription provisioning server to create the subscription profile based on the capability information of the subscriber entity.

According to a third aspect there is presented a subscription provisioning server for creating a subscription profile for a subscriber entity. The subscription provisioning server comprises an obtain module configured to obtain, from the subscriber entity, a request for download of the subscription profile. The request comprises capability information of the subscriber entity. The subscription provisioning server comprises a create module configured to create the subscription profile based on the capability information as obtained from the subscriber entity.

According to a fourth aspect there is presented a computer program for creating a subscription profile for a subscriber entity. The computer program comprises computer program code which, when run on processing circuitry of a subscription provisioning server, causes the subscription provisioning server to perform a method according to the first aspect.

A further object of embodiments herein is to provide efficient ordering of subscription profiles that in turn enables efficient handling of subscription profiles for eUICCs and other types of subscriber entities.

According to a fifth aspect there is presented a method for ordering a subscription profile for a subscriber entity. The method is performed by a mobile network operator entity. The method comprises providing, to a subscription provisioning server, an order for creating the subscription profile for the subscriber entity. The order comprises a set of rules, or an indication to the set of rules. The set of rules pertaining to which types of subscription profile is to be created for the subscriber entity.

According to a sixth aspect there is presented a mobile network operator entity for ordering a subscription profile for a subscriber entity. The mobile network operator entity comprises processing circuitry. The processing circuitry is configured to cause the mobile network operator entity to provide, to a subscription provisioning server, an order for creating the subscription profile for the subscriber entity. The order comprises a set of rules, or an indication to the set of rules. The set of rules pertaining to which types of subscription profile is to be created for the subscriber entity.

According to a seventh aspect there is presented a mobile network operator entity for ordering a subscription profile for a subscriber entity. The mobile network operator entity comprises a provide module configured to provide, to a subscription provisioning server, an order for creating the subscription profile for the subscriber entity. The order comprises a set of rules, or an indication to the set of rules. The set of rules pertaining to which types of subscription profile is to be created for the subscriber entity.

According to an eighth aspect there is presented a computer program for ordering a subscription profile for a subscriber entity, the computer program comprising computer program code which, when run on processing circuitry of a mobile network operator entity, causes the mobile network operator entity to perform a method according to the fifth aspect.

According to a ninth aspect there is presented a computer program product comprising a computer program according to at least one of the fourth aspect and the eighth aspect and a computer readable storage medium on which the computer program is stored. The computer readable storage medium could be a non-transitory computer readable storage medium.

Advantageously, these aspects enable efficient handling of subscription profiles for eUICCs and other types of subscriber entities.

Advantageously, these aspects alleviate the need for the mobile network operator to order a specific type of a profile, or batch of profiles, for subscriber entities in devices that are not necessarily known yet (e.g. having prepaid subscriptions). Instead, the mobile network operator might define rules based on which the subscription provisioning server could automatically select the best suited profile type based on the information directly provided by the subscriber entities.

Advantageously, these aspects eliminate errors occurring when the profile type is allocated for a specific type of subscriber entities.

Advantageously, these aspects enable automatic profile selection for a batch of subscriber entities. This is especially advantageous when the subscriber entities are part of, integrated in, or provided in, Internet of Things devices, such as narrowband Internet of Things devices.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 3, 4 and 7 are flowcharts of methods according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The wording that a certain data item or piece of information is obtained by a first device should be construed as that data item or piece of information being retrieved, fetched, received, or otherwise made available to the first device. For example, the data item or piece of information might either be pushed to the first device from a second device or pulled by the first device from a second device. Further, in order for the first device to obtain the data item or piece of information, the first device might be configured to perform a series of operations, possible including interaction with the second device. Such operations, or interactions, might involve a message exchange comprising any of a request message for the data item or piece of information, a response message comprising the data item or piece of information, and an acknowledge message of the data item or piece of information. The request message might be omitted if the data item or piece of information is neither explicitly nor implicitly requested by the first device.

The wording that a certain data item or piece of information is provided by a first device to a second device should be construed as that data item or piece of information being sent or otherwise made available to the second device by the first device. For example, the data item or piece of information might either be pushed to the second device from the first device or pulled by the second device from the second device. Further, in order for the first device to provide the data item or piece of information to the second device, the first device and the second device might be configured to perform a series of operations in order to interact with each other. Such operations, or interaction, might involve a message exchange comprising any of a request message for the data item or piece of information, a response message comprising the data item or piece of information, and an acknowledge message of the data item or piece of information. The request message might be omitted if the data item or piece of information is neither explicitly nor implicitly requested by the second device.

Figure 1:
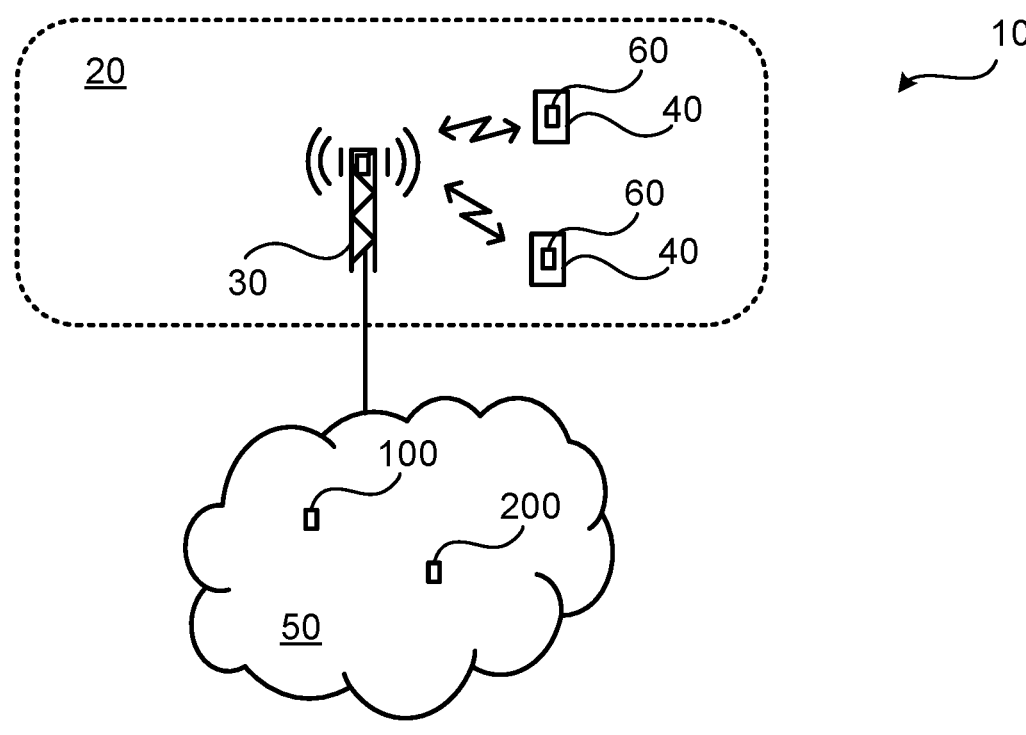
FIG. 1 is a schematic diagram illustrating a communication network according to embodiments.

FIG. 1 is a schematic diagram illustrating a communication network 10 where embodiments presented herein can be applied. The communication network 10 comprises a radio access network 20, and a combined core and service network 50. In turn, the radio access network 20 comprises a radio access network node 30 and the combined core and service network 50 comprises a subscription provisioning server 100 and an MNO entity 200. In some examples the subscription provisioning server 100 is an SM-DP+ entity (or just SM-DP+ for short). The radio access network node 30 is configured to provide network access to, and thus to serve, wireless terminal devices 40, such as a user equipment (UE), network equipped vehicle, network equipped sensor, a so-called Internet of Things (IoT) device, or the like. Each wireless terminal device 40 comprises a respective subscriber entity 60. In some examples the subscriber entity 60 is an eUICC entity (or just eUICC for short), an integrated Universal Integrated Circuit Card (iUICC) entity (or just iUICC for short), a European Telecommunications Standards Institute Smart Secure Platform (ETSI SSP). Thus, although the eUICC will be used below to represent the subscriber entity 60, the eUICC might be an iUICC or an ETSI SSP.

As the skilled person understands, the radio access network 20 as well as the combined core and service network 50 might comprise a plurality of functions, nodes, devices, and entities for facilitating communication between the wireless terminal devices 40 and the combined core and service network 50. Functions, nodes, devices, and entities not relevant for the herein disclosed embodiments have been omitted for brevity.

As noted above, there is still a need for improved handling of subscription profiles for eUICCs 60 and other types of subscriber entities.

Figure 2:
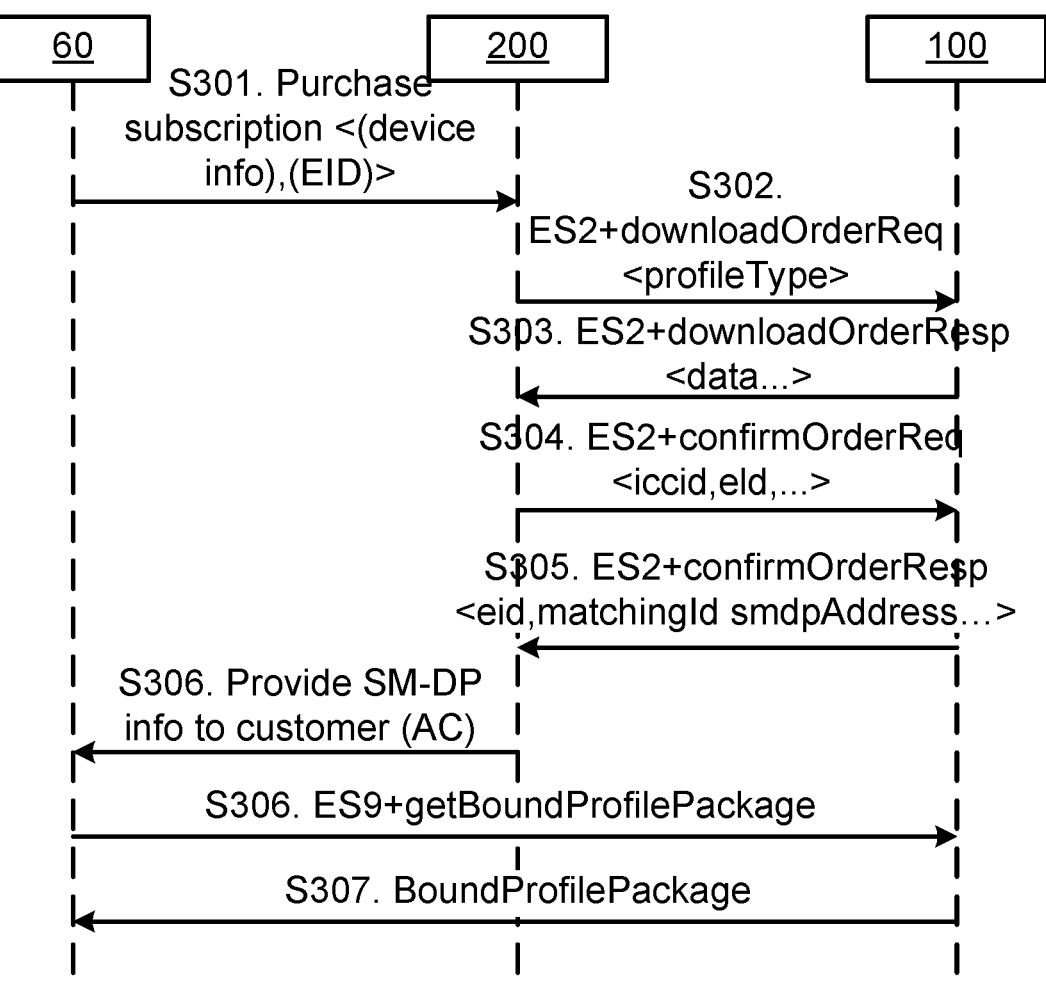
FIG. 2 is a signalling diagram according to state of the art.

In particular, the SM-DP+ 100 performs an eligibility check of the eUICC 60 at the time download of the subscription profile is requested by the eUICC 60, whilst the subscription profile is prepared and created already at the subscription profile order time. To further illustrate this, reference is now made to FIG. 2. FIG. 2 is a signalling diagram of a method for subscription profiler order and eligibility check according to state of the art.

S301: The user orders a subscription from the MNO entity 200.

S302: The MNO entity 200 sends an order for a subscription profile in an ES2+.downloadOrder message for the SM-DP+ 100 to prepare a subscription profile and defines the subscription profile type in standard way.

S303: The SM-DP+ 100 generates, stores and returns Authentication Vector (AV) data to the MNO entity 200 in an ES2+ downloadOrderResp message, and also creates the subscription profile. The AV data might comprise e.g. international mobile subscriber identity (IMSI), Integrated Circuit Card Identifier (ICCID; i.e., an identifier of the eUICC 60), individual subscriber authentication key (Ki), and/or other subscriber specific data elements.

S304: The MNO entity 200 responds with an ES2+ confirmOrderReq message to the SM-DP+ 100, where the message according to the aforementioned SGP.22 specification. This message can use any of the mechanisms supported by the SGP.22 specification, for example use MatchingID, or register the event based on the requestor's EID to a subscription server, such as a Subscription Manager-Discovery Server (SM-DS).

S305: The SM-DP+ 100 responds with an ES2+ confirmOrderResp message to the MNO entity 200, where the message comprises a pointer to the created subscription profile, according to the aforementioned SGP.22 specification.

S306: The MNO entity 200 delivers the pointer for download initialization of the subscription profile to the user, or the subscriber entity connects to the subscription server or a default-SM-DP+ 100.

S307: The subscriber entity request download of the subscription profile by providing the pointer and eligibility check information to the SM-DP+ 100 in an ES9+ getBoundSubscription profilePackage message. When the SM-DP+ 100 receives this message the SM-DP+ 100 will perform an eligibility check and only allow download of the created subscription profile if the eligibility check is successful.

S308: The SM-DP+ 100 enables download of the created subscription profile to the subscriber entity in a bounded subscription profile package.

When the eUICC 60 triggers download of the subscription profile from the SM-DP+ 100, the eUICC 60 and the SM-DP+ 100 both establish a secure, mutually authenticated, communication channel and the subscription profile is delivered to the eUICC 60 over this communication channel. During the download procedure for the subscription profile, the eUICC 60 delivers the capabilities of the eUICC 60 to the SM-DP+ 100s. These capabilities include a set of supported features of the eUICC 60, e.g., supported Remote SIM Provisioning (RSP; where SIM is short for subscriber identity module or subscriber identification module) version, supported subscription profile type, supported network type, International Mobile Equipment Identity (IMEI) and supported subscription profile size. The SM-DP+ 100 uses the capabilities information to perform an eligibility check i.e., whether the eUICC 60 will support the subscription profile prepared for this eUICC 60. If the eUICC 60 does not support the prepared subscription profile, the SM-DP+ 100 may reject the download of the subscription profile. This may result in a bad user experience.

The embodiments disclosed herein therefore relate to mechanisms for creating a subscription profile for a subscriber entity 60 and ordering a subscription profile for a subscriber entity 60. In order to obtain such mechanisms there is provided a subscription provisioning server 100, a method performed by the subscription provisioning server 100, a computer program product comprising code, for example in the form of a computer program, that when run on processing circuitry of the subscription provisioning server 100, causes the subscription provisioning server 100 to perform the method. In order to obtain such mechanisms there is further provided a mobile network operator entity 200, a method performed by the mobile network operator entity 200, and a computer program product comprising code, for example in the form of a computer program, that when run on processing circuitry of the mobile network operator entity 200, causes the mobile network operator entity 200 to perform the method.

Figure 3:
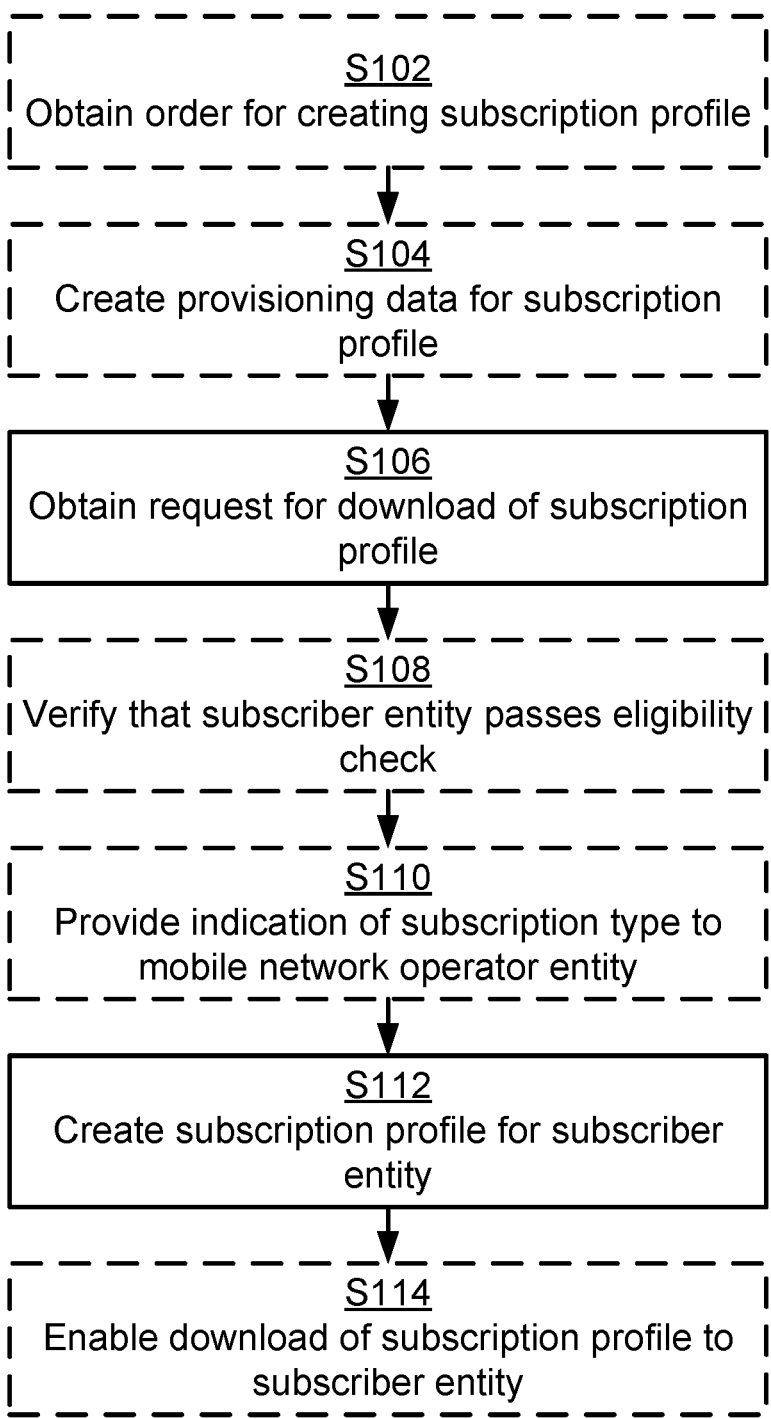

Reference is now made to FIG. 3 illustrating a method for creating a subscription profile for a subscriber entity 60 as performed by the subscription provisioning server 100 according to an embodiment.

It is assumed that a subscription profile is to be created for the subscriber entity 60. The creation is triggered by the subscription provisioning server 100 obtaining a request for download of the subscription profile from the subscriber entity 60. Hence, the subscription provisioning server is configured to perform step S106:

S106: The subscription provisioning server 100 obtains, from the subscriber entity 60, a request for download of the subscription profile. The request comprises capability information of the subscriber entity 60.

According to the herein disclosed embodiments, the subscription profile is created at the eligibility check time. Hence, the subscription provisioning server 100 is configured to perform step S112:

S112: The subscription provisioning server 100 creates the subscription profile based on the capability information as obtained from the subscriber entity 60.

This method enables the number of rejected subscription profiles due to mismatch between prepared subscription profiles and eligibility check information of the subscriber entity to be reduced. This in turn will reduce network resource usage and also improve the user experience.

Embodiments relating to further details of creating a subscription profile for a subscriber entity 60 as performed by the subscription provisioning server 100 will now be disclosed.

In some aspects, the request for download of the subscription profile is preceded by an order for creating the subscription profile from the mobile network operator entity 200. Hence, in some embodiments, the subscription provisioning server 100 is configured to perform (optional) step S102:

S102: The subscription provisioning server 100 obtains, from a mobile network operator entity 200, an order for creating the subscription profile for the subscriber entity 60.

The order in step S102 is received before the request in step S108 is received.

The order might either pertain to only one single subscription profile to be created for only one single subscriber entity 60 or pertain to a batch of subscription profiles to be created for a batch of subscriber entities 60.

In some aspects, reception of the order for creating the subscription profile triggers the subscription provisioning server 100 to create provisioning data for the subscription profile. Hence, in some embodiments, the subscription provisioning server 100 is configured to perform (optional) step S104:

S104: The subscription provisioning server 100 creates provisioning data for the subscription profile only upon having obtained the order for creating the subscription profile for the subscriber entity 60.

In other aspects, the provisioning data for the subscription profile is by the subscription provisioning server 100 created offline an in advance of receiving the order for creating the subscription profile for the subscriber entity 60. In any case, the provisioning data can then be used for creating the subscription profile, for example by inserting the provisioning data to an appropriate subscription profile template.

There could be different ways in which the subscription provisioning server 100 creates the subscription profile. In some aspects, how the subscription profile is dependent on what information is provided in the order as received from the mobile network operator entity 200 in step S102.

According to some aspects, the subscription profile is created according to a subscription profile type specified in the order. That is, in some embodiments, the order comprises a subscription profile type, and the subscription profile is created in accordance with the subscription profile type. In other aspects, the subscription profile is created according to a rule set or an indication to such a rule set. In particular, in some embodiments, the order comprises a set of rules, or an indication to the set of rules, where the set of rules pertains to according to which subscription profile type the subscription profile is to be created for the subscriber entity 60. The subscription profile is then created in accordance with the capability information of the subscriber entity 6o (and the provisioning data) in combination with either the set of rules or the indication to the set of rules.

In some embodiments, the subscription profile, prior to being created, is selected in accordance with the capability information of the subscriber entity 6o in combination with either the set of rules or the indication to the set of rules. According to some aspects, the subscription profile is selected from one or more available subscription profile types. There might be different ways to select the subscription profile from these one or more available subscription profile types. In some embodiments, the subscription profile type is selected from a set of subscription profile templates in accordance with the set of rules, or the indication to the set of rules. In some embodiments, the subscription profile type further is selected based on information obtained from the mobile network operator entity 200 in the order. In some embodiments, the subscription profile type is selected by the subscription provisioning server 100 providing data to a subscription profile selection entity and receiving a subscription profile specification in return from the subscription profile selection entity, and where the subscription profile is created according to the subscription profile specification.

In some aspects, the mobile network operator entity 200 is notified about the subscription type selected for creating the subscription profile. In particular, in some embodiments, the subscription provisioning server 100 is configured to perform (optional) step S110:

S110: The subscription provisioning server 100 provides an indication to the mobile network operator entity 200, the indication specifying a subscription type according to which the subscription profile was selected.

Step S110 is performed before, or in conjunction with, the creation of the subscription profile in step S112. Further details of how the subscription provisioning server 100 might provide the indication to the mobile network operator entity 200 will be disclosed below with reference to FIG. 5.

In further embodiments, the order specifies how the subscription profile type is to be selected. Step S110 needs then not to be performed. Neither does step S110 needs to be performed in case the subscription profile selection entity is operated, or controlled by, the mobile network operator entity 200.

In some aspects, a verification is made that it indeed is possible to create a subscription profile for the subscriber entity 60. In particular, in some embodiments, the subscription provisioning server 100 is configured to perform (optional) step S108:

S108: The subscription provisioning server 100 verifies that the subscriber entity 60 passes an eligibility check before, or as part of, creating the subscription profile. The eligibility check is based on the capability information of the subscriber entity 60. The eligibility test pertains to whether the subscriber entity 60 will support the subscription profile or not.

Step S108 is performed before, or in conjunction with, step S112. Further aspects of how the subscription provisioning server 100 might verify that the subscriber entity 60 passes the eligibility check will be disclosed below with reference to FIG. 7.

Once the subscription profile has been created (and has been successfully passed the eligibility check) the subscription profile can be downloaded to the subscriber entity 60. Hence, in some embodiments, the subscription provisioning server 100 is configured to perform (optional) step S114:

S114: The subscription provisioning server 100 enables download of the created subscription profile to the subscriber entity 60.

Reference is now made to FIG. 4 illustrating a method for ordering a subscription profile for a subscriber entity 60 as performed by the mobile network operator entity 200 according to an embodiment.

As disclosed above, the subscription provisioning server 100 might receive an order from the mobile network operator entity 200 for creating the subscription profile for the subscriber entity 60. In particular, the mobile network operator entity 200 is configured to perform step S202.

S202: The mobile network operator entity 200 provides, to the subscription provisioning server 100, an order for creating the subscription profile for the subscriber entity 60. The order comprises a set of rules, or an indication to the set of rules. The set of rules pertains to which types of subscription profile is to be created for the subscriber entity 60.

Embodiments relating to further details of ordering a subscription profile for a subscriber entity 60 as performed by the mobile network operator entity 200 will now be disclosed.

As disclosed above, the order might either pertain to only one single subscription profile to be created for only one single subscriber entity 60 or pertain to a batch of subscription profiles to be created for a batch of subscriber entities 60.

As disclosed above, in some aspects, the mobile network operator entity 200 is notified about the subscription type selected for creating the subscription profile. In particular, in some embodiments, the mobile network operator entity 200 is configured to perform (optional) step S204:

S204: The mobile network operator entity 200 obtains an indication from a subscription provisioning server 100, the indication specifying a subscription type according to which the subscription profile was created by the subscription provisioning server 100.

Figure 5:
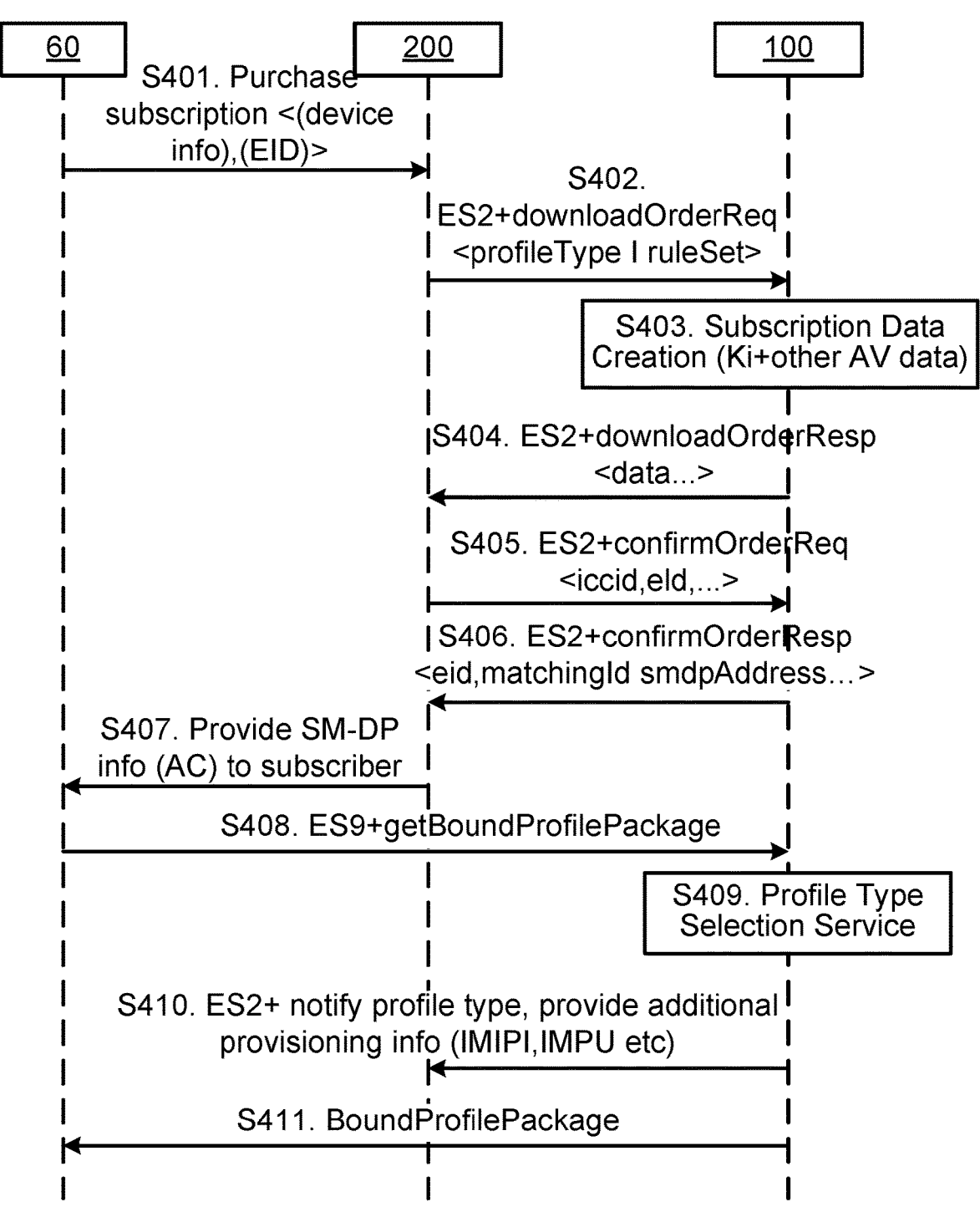
FIGS. 5 and 6 are signalling diagrams according to embodiments.

A first particular embodiment for ordering a subscription profile for a subscriber entity 60 and for creating a subscription profile for the subscriber entity 60 based on at least some of the above disclosed embodiments will now be disclosed in detail with reference to the signalling diagram FIG. 5.

S401: The user orders a subscription from the MNO entity 200.

S402: The MNO entity 200 sends an order for a subscription profile in an ES2+.downloadOrder message for the SM-DP+ 100 to prepare a subscription profile and has the choice to either define the subscription profile type in standard way or indicate to the SM-DP+ 100 to select the subscription profile (either by the SM-DP+ 100 itself or by a separate selection function). In the latter case, the MNO entity 200 might either provide an indication to a set of rules, which (previously defined) ruleset will be used for subscription profile selection, or provide the set of rules (i.e. including the actual rules, based on which the subscription profile selection is automatically performed).

S403, S404: The SM-DP+ 100 generates, stores and returns AV data to the MNO entity 200 in an ES2+ downloadOrderResp message, but does not yet create the subscription profile. The AV data might comprise e.g. IMSI, ICCID, Ki, and/or other subscriber specific data elements.

S405: The MNO entity 200 responds with an ES2+ confirmOrderReq message to the SM-DP+ 100, where the ES2+ confirmOrderReq message is defined as in the aforementioned SGP.22 specification.

S406: The SM-DP+ 100 responds with an ES2+ confirmOrderResp message to the MNO entity 200, where the message comprises a pointer to the yet not created subscription profile and otherwise is defined as in the aforementioned SGP.22 specification.

S407: The MNO entity 200 delivers the pointer for download initialization of the subscription profile to the user.

S408, S409: The subscriber entity requests download of the subscription profile by providing the pointer and eligibility check information to the SM-DP+ 100 in an ES9+ getBoundSubscription profilePackage message. When the SM-DP+ 100 receives this message the SM-DP+ 100 will perform an eligibility check and only proceed with creating the actual subscription profile if the eligibility check is successful. The SM-DP+ 100 will then, if the subscription profile type was defined in the download order, create and provide the subscription profile to the eUICC 60. If the subscription profile type was not defined, but either the set of rules or an indication to the set of rules was provided in step S402, the SM-DP+ 100 interprets the eligibility check information as subscription profile property requirements, and processes the rules, as will be more disclosed in detail below. By processing the rules, the SM-DP+ 100 selects the correct subscription profile type and creates the subscription profile. If no match for the rules is found in the subscription profile type inventory, the SM-DP+ 100 might try to use a default subscription profile type as template when creating the subscription profile.

S410: Optionally, for example when either the set of rules or an indication to the set of rules was provided in step S402, the SM-DP+ 100 provides information of the thus created subscription profile to the MNO entity 200 in an ES2+ notify subscription profile type message.

S411: The SM-DP+ 100 enables download of the thus created subscription profile to the subscriber entity in a bounded subscription profile package.

Figure 6:
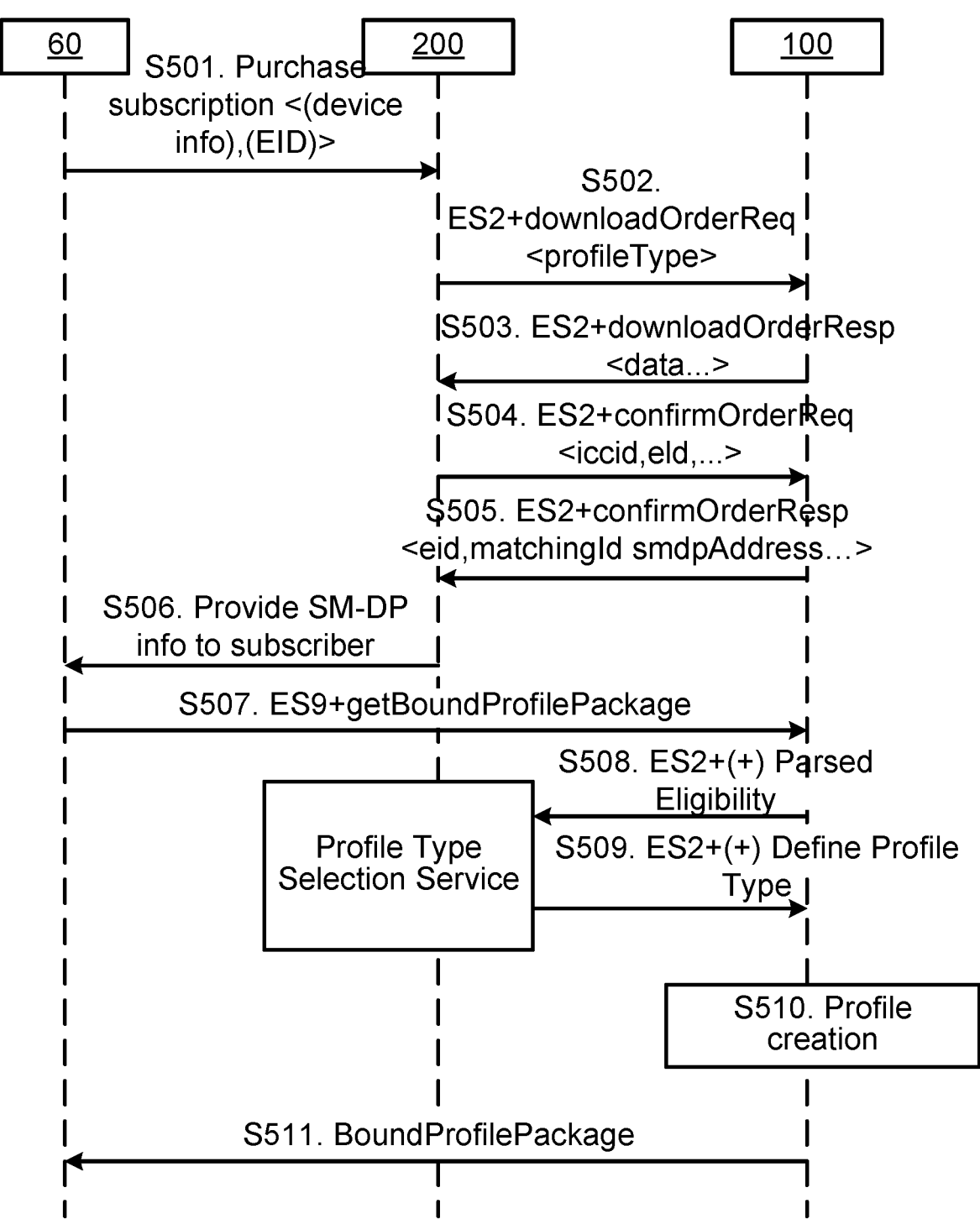

A second particular embodiment for ordering a subscription profile for a subscriber entity 60 and for creating a subscription profile for the subscriber entity 60 based on at least some of the above disclosed embodiments will now be disclosed in detail with reference to the signalling diagram of FIG. 6. In comparison to FIG. 5, there is in FIG. 6 an alternative location for the subscription profile type selection. In the example of FIG. 6, this function is run by the MNO, which would receive the eligibility check information from the SM-DP+ 100 and based on that return information of which subscription profile to select, or whether to deny subscription profile download on e.g. EIR or other blacklisting mechanism.

S501: The user orders a subscription from the MNO entity 200.

S502: The MNO entity 200 sends an order for a subscription profile in an ES2+.downloadOrder message for the SM-DP+ 100 to prepare a subscription profile and has the choice to either define the subscription profile type in standard way or indicate to the SM-DP+ 100 to select the subscription profile (either by the SM-DP+ 100 itself or by a separate selection function). In the latter case, the MNO entity 200 might either provide an indication to a set of rules, which (previously defined) ruleset will be used for subscription profile selection, or provide the set of rules (i.e. including the actual rules, based on which the subscription profile selection is automatically performed).

S503: The SM-DP+ 100 generates, stores and returns AV data to the MNO entity 200 in an ES2+ downloadOrderResp message, but does not yet create the subscription profile. The AV data might comprise e.g. IMSI, ICCID, Ki, and/or other subscriber specific data elements.

S504: The MNO entity 200 responds with an ES2+ confirmOrderReq message to the SM-DP+ 100, where the message is defined as in the aforementioned SGP.22 specification.

S505: The SM-DP+ 100 responds with an ES2+ confirmOrderResp message to the MNO entity 200, where the message comprises a pointer to the yet not created subscription profile and otherwise is defined as in the aforementioned SGP.22 specification.

S506: The MNO entity 200 delivers the pointer for download initialization of the subscription profile to the user.

S507: The subscriber entity request download of the subscription profile by providing the pointer and eligibility check information to the SM-DP+ 100 in an ES9+ getBoundSubscription profilePackage message. When the SM-DP+ 100 receives this message the SM-DP+ 100 will perform an eligibility check and only proceed with creating the actual subscription profile if the eligibility check is successful.

Assume that either the set of rules or an indication to the set of rules was provided in step S502. The SM-DP+ 100 interprets the eligibility check information as subscription profile property requirements, and processes the rules, as will be more disclosed in detail below. By processing the rules, the SM-DP+ 100 selects the correct subscription profile type and creates the subscription profile. If no match for the rules is found in the subscription profile type inventory, the SM-DP+ 100 might try to use a default subscription profile type as template when creating the subscription profile.

S508: The SM-DP+ 100 provides the eligibility check information to a subscription profile selection entity, which then selects a subscription profile type by interpreting the eligibility check information as subscription profile property requirements. The eligibility check information might be provided in an ES2+ Parsed Eligibility Info message.

S509: The SM-DP+ 100 obtains the thus selected subscription profile type from the subscription profile selection entity. The subscription profile type might be obtained in an ES2+ Define Subscription profile Type message.

S510: The SM-DP+ 100 creates the subscription profile based on the obtained subscription profile type and any other available information.

S511: The SM-DP+ 100 enables download of the thus created subscription profile to the subscriber entity in a bounded subscription profile package.

Figure 7:
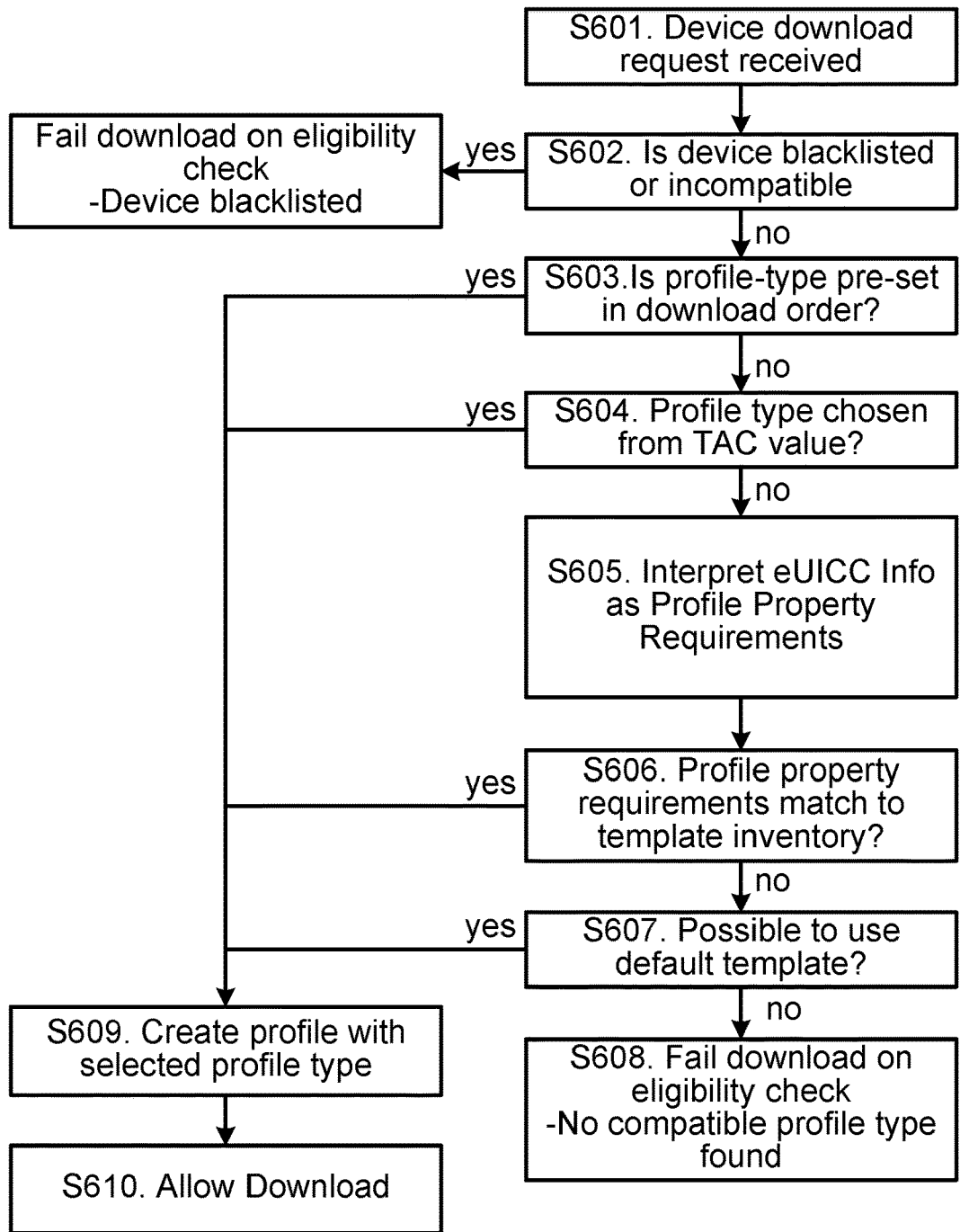

Reference is now made to the flowchart of FIG. 7 that shows an example of subscription profile selection according to embodiments disclosed herein.

S601: The SM-DP+ 100 obtain an order for a subscription profile from the MNO entity 200.

S602: The SM-DP+ 100 checks whether the subscriber entity for which the subscription profile is ordered is any of blacklisted or incompatible, or not. Step S603 is entered when the subscriber entity is neither blacklisted nor incompatible. Step S611 is entered when the subscriber entity is blacklisted and/or incompatible.

S603: The SM-DP+ 100 checks whether the subscription profile type is explicitly set in the order or not. Step S609 is entered when the subscription profile type is explicitly set in the order. Step S604 is entered when the subscription profile type is not explicitly set in the order.

S604: The SM-DP+ 100 checks whether the subscription profile type can be selected using a TAC value or not. Step S609 is entered when the subscription profile type can be selected using a TAC value. Step S605 is entered when the subscription profile type cannot be selected using a TAC value.

S605: The SM-DP+ 100 interprets the eUICC information as subscription profile property requirements.

S606: The SM-DP+ 100 checks whether the subscription profile property requirements match any subscription profile template in an inventory of template subscription profile types or not. Step S609 is entered when the subscription profile property requirements match a subscription profile template. Step S607 is entered when the subscription profile property requirements do not match a subscription profile template.

S607: The SM-DP+ 100 checks whether it is possible to use a default template to create the subscription profile or not. Step S609 is entered it is possible to use a default template to create the subscription profile. Step S608 is entered when it is not possible to use a default template to create the subscription profile.

S608: The eligibility check for the subscriber entity has failed since no compatible subscription profile type can be found. The SM-DP+ 100 can thus not create any subscription profile for the subscriber entity.

S609: The SM-DP+ 100 creates a subscription profile for the subscriber entity based on the selected subscription profile type.

S610: The SM-DP+ 100 allows download of the thus created subscription profile to the subscriber entity.

S611: The eligibility check for the subscriber entity has failed since the subscriber entity is blacklisted and/or incompatible. The SM-DP+ 100 can thus not create any subscription profile for the subscriber entity.

As noted above, the SM-DP+ 100 receives information from the subscriber entity when subscription profile download is requested. The information could be device information (as specified in aforementioned document "SGP.22—RSP Technical Specification" and in document "SGP.21—eSIM Architecture Specification", Version 2.2, 1 Sep. 2017, published by the GSM Association) and eUICC 60 information (eUICC 60 Info1+Info2) (as specified in aforementioned documents "SGP.22—RSP Technical Specification" and "SGP.21—eSIM Architecture Specification"). Examples of device information are: type allocation code (TAC), device capabilities, IMEI (optional), preferred languages (optional), indication for enterprise capable device, device test mode, and RSP functions supported. Examples of device capabilities are: radio access technologies (including release), contactless (the single wire protocol (SWP) and human computer interaction (HCI) interfaces as well as the associated application programming interfaces (APIs)), RSP central revocation list subversion (CRL SVN), local subscription profile assistant subversion (LPA SVN), card application toolkit support, and eUICC 60 form factor type.

The subscription profile can then be created based on these rules and the eligibility data received from the eUICC 60.

Table 1 gives an example of how the TAC could be used for selecting the profile type. It is noted that there could be any number of these rules and that each rule could point to one or more profile types.

TABLE 1

| Rule | Profile Type |
|---|---|
| TAC code | Template 1 |
| TAC code wildcard | Template 2 |
| TAC name 1 | Template 3 |
| TAC name 1 wildcard | Template 4 |
| TAC name 2 | Template 5 |
| TAC name 2 wildcard | Template 6 |
| . . . | . . . |
| No match | Template N |

Table 2 gives an example of how the eUICC information and the device information provided by the eUICC to the SM-DP+ is interpreted in view of profile property requirements.

TABLE 2

| eUICC information field | Profile property requirement |
|---|---|
| lowestSvn, VersionType | Minimum version |
| highestSvn, VersionType* | Maximum version |
| profilePackageVersion, VersionType | Maximum profile package version |
| extCardResource, OCTET STRING | ETSI ADPU settings |
| uiccCapability, UICCCapability | List of UICC Capabilities, e.g. usimSupport, isimSupport, csimSupport, . . . |
| forbiddenProfilePolicyRules | List of forbidden policy rules |

Table 3 gives an example of how each profile template has a set of profile properties defined. If the profile property requirements from the eUICC match a profile template in the inventory, that profile template is selected. If not, either a default profile template is selected, or no profile template is selected (in case not even the default template can be used).

TABLE 3

| Profile Properties Supported by a profile template | Properties |
|---|---|
| Version types | <list of versions> |
| profilePackageVersion | <list of profile packages> |
| extCardResource | ETSI ADPU settings |
| uiccCapability, UICCCapability | List of UICC Capabilities, e.g. usimSupport, isimSupport, csimSupport, . . . |
| forbidden ProfilePolicyRules | List of forbidden policy rules |
| Size of profile | <size of this profile template> |
| Javacard required for app | <Boolean> |
| SIMtoolkit template | <Boolean> |

Figure 8:
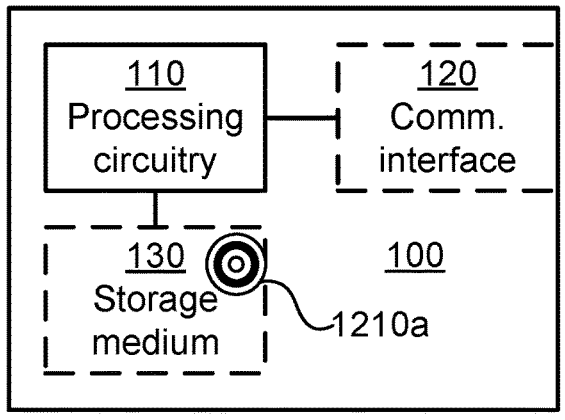
FIG. 8 is a schematic diagram showing functional units of a subscription provisioning server according to an embodiment.

FIG. 8 schematically illustrates, in terms of a number of functional units, the components of a subscription provisioning server 100 according to an embodiment. Processing circuitry 110 is provided using any combination of one or more of a suitable central processing unit (CPU), multiprocessor, microcontroller, digital signal processor (DSP), etc., capable of executing software instructions stored in a computer program product 1210*a* (as in FIG. 12), e.g. in the form of a storage medium 130. The processing circuitry 11*o* may further be provided as at least one application specific integrated circuit (ASIC), or field programmable gate array (FPGA).

Particularly, the processing circuitry 110 is configured to cause the subscription provisioning server 100 to perform a set of operations, or steps, as disclosed above. For example, the storage medium 130 may store the set of operations, and the processing circuitry 110 may be configured to retrieve the set of operations from the storage medium 130 to cause the subscription provisioning server 100 to perform the set of operations. The set of operations may be provided as a set of executable instructions. Thus the processing circuitry 11*o* is thereby arranged to execute methods as herein disclosed.

The storage medium 130 may also comprise persistent storage, which, for example, can be any single one or combination of magnetic memory, optical memory, solid state memory or even remotely mounted memory.

The subscription provisioning server 100 may further comprise a communications interface 120 for communications with other entities, functions, nodes, and devices of the communication network 10. As such the communications interface 120 may comprise one or more transmitters and receivers, comprising analogue and digital components.

The processing circuitry 110 controls the general operation of the subscription provisioning server 100 e.g. by sending data and control signals to the communications interface 120 and the storage medium 130, by receiving data and reports from the communications interface 120, and by retrieving data and instructions from the storage medium 130. Other components, as well as the related functionality, of the subscription provisioning server 100 are omitted in order not to obscure the concepts presented herein.

Figure 9:
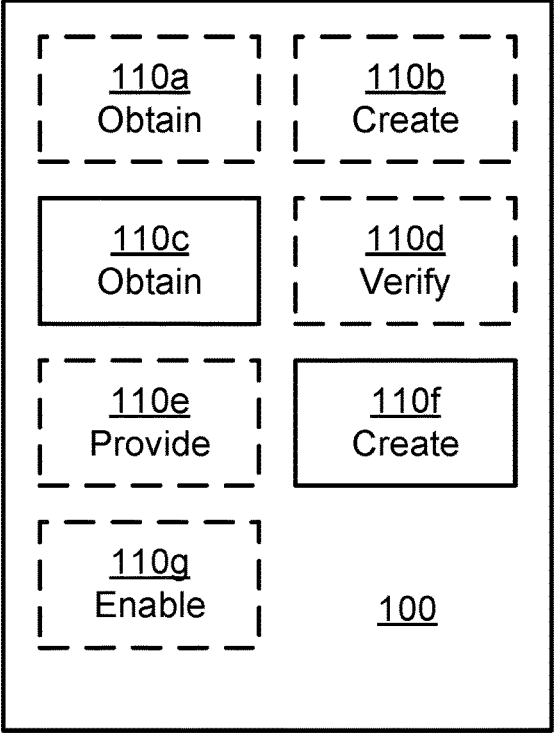
FIG. 9 is a schematic diagram showing functional modules of a subscription provisioning server according to an embodiment.

FIG. 9 schematically illustrates, in terms of a number of functional modules, the components of a subscription provisioning server 100 according to an embodiment. The subscription provisioning server 100 of FIG. 9 comprises a number of functional modules; an obtain module 110*c* configured to perform step S106, and a create module 110*f* configured to perform step S112. The subscription provisioning server 100 of FIG. 9 may further comprise a number of optional functional modules, such as any of an obtain module 110*a* configured to perform step S102, a create module 110*b* configured to perform step S104, a verify module 110*d* configured to perform step S108, a provide module 110*e* configured to perform step S110, and an enable module 110*g* configured to perform step S114. In general terms, each functional module 110*a*-110*g* may be implemented in hardware or in software. Preferably, one or more or all functional modules 110*a*-110*g* may be implemented by the processing circuitry 110, possibly in cooperation with the communications interface 120 and/or the storage medium 130. The processing circuitry 110 may thus be arranged to from the storage medium 130 fetch instructions as provided by a functional module 110*a*-110*g* and to execute these instructions, thereby performing any steps of the subscription provisioning server 100 as disclosed herein.

Figure 10:
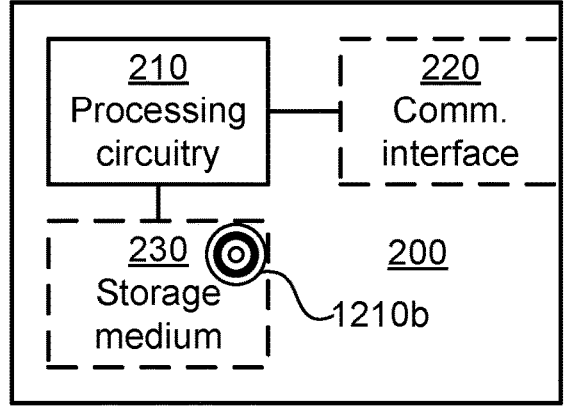
FIG. 10 is a schematic diagram showing functional units of a mobile network operator entity according to an embodiment.

FIG. 10 schematically illustrates, in terms of a number of functional units, the components of a mobile network operator entity 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210*b* (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the mobile network operator entity 200 to perform a set of operations, or steps, as disclosed above. For example, the storage medium 230 may store the set of operations, and the processing circuitry 210 may be configured to retrieve the set of operations from the storage medium 230 to cause the mobile network operator entity 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The mobile network operator entity 200 may further comprise a communications interface 220 for communications with other entities, functions, nodes, and devices of the communication network 10. As such the communications interface 220 may comprise one or more transmitters and receivers, comprising analogue and digital components.

The processing circuitry 210 controls the general operation of the mobile network operator entity 200 e.g. by sending data and control signals to the communications interface 220 and the storage medium 230, by receiving data and reports from the communications interface 220, and by retrieving data and instructions from the storage medium 230. Other components, as well as the related functionality, of the mobile network operator entity 200 are omitted in order not to obscure the concepts presented herein.

Figure 11:
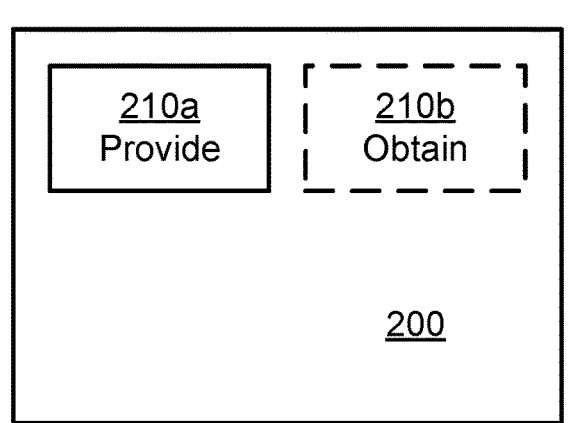
FIG. 11 is a schematic diagram showing functional modules of a mobile network operator entity according to an embodiment.

FIG. 11 schematically illustrates, in terms of a number of functional modules, the components of a mobile network operator entity 200 according to an embodiment. The mobile network operator entity 200 of FIG. 11 comprises a provide module 210a configured to perform step S210a. The mobile network operator entity 200 of FIG. 11 may further comprise a number of optional functional modules, such as an obtain module 210b configured to perform step S204. In general terms, each functional module 210a-210b may be implemented in hardware or in software. Preferably, one or more or all functional modules 210a-210b may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210b and to execute these instructions, thereby performing any steps of the mobile network operator entity 200 as disclosed herein.

Figure 12:
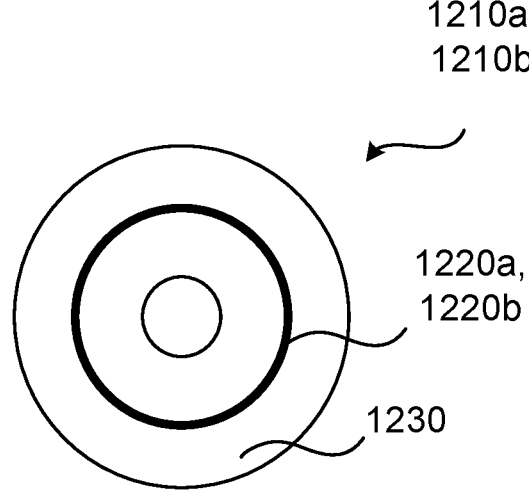
FIG. 12 shows one example of a computer program product comprising computer readable means according to an embodiment.

FIG. 12 shows one example of a computer program product 1210a, 1210b comprising computer readable means 1230. On this computer readable means 1230, a computer program 1220a can be stored, which computer program 1220a can cause the processing circuitry 110 and thereto operatively coupled entities and devices, such as the communications interface 120 and the storage medium 130, to execute methods according to embodiments described herein. The computer program 1220a and/or computer program product 1210a may thus provide means for performing any steps of the subscription provisioning server 100 as herein disclosed. On this computer readable means 1230, a computer program 1220b can be stored, which computer program 1220b can cause the processing circuitry 210 and thereto operatively coupled entities and devices, such as the communications interface 220 and the storage medium 230, to execute methods according to embodiments described herein. The computer program 1220b and/or computer program product 1210b may thus provide means for performing any steps of the mobile network operator entity 200 as herein disclosed.

In the example of FIG. 12, the computer program product 1210a, 1210b is illustrated as an optical disc, such as a CD (compact disc) or a DVD (digital versatile disc) or a Blu-Ray disc. The computer program product 1210a, 1210b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220a, 1220b is here schematically shown as a track on the depicted optical disk, the computer program 1220a, 1220b can be stored in any way which is suitable for the computer program product 1210a, 1210b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for creating a subscription profile for a subscriber entity, the method being performed by a subscription provisioning server, the method comprising:

obtaining, from the subscriber entity, a request for download of the subscription profile, the request comprising capability information of the subscriber entity;

creating the subscription profile based on the capability information as obtained from the subscriber entity and in accordance with a set of rules received from a mobile network operator entity; and verifying that the subscriber entity passes an eligibility check before, or as part of, creating the subscription profile, wherein the eligibility check is based on the capability information of the subscriber entity and pertains to whether the subscriber entity will support the subscription profile or not.

2. The method according to claim 1, further comprising:

enabling download of the created subscription profile to the subscriber entity.

3. The method according to claim 1, further comprising:

obtaining, from a mobile network operator entity, an order for creating the subscription profile for the subscriber entity.

4. The method according to claim 3, further comprising:

creating provisioning data for the subscription profile only upon having obtained the order for creating the subscription profile for the subscriber entity.

5. The method according to claim 3, wherein the order comprises a subscription profile type, and wherein the subscription profile is created in accordance with the subscription profile type.

6. The method according to claim 3, wherein the order comprises a set of rules, or an indication to the set of rules, the set of rules pertaining to according to which subscription profile type the subscription profile is to be created for the subscriber entity, and wherein the subscription profile is created in accordance with the capability information of the subscriber entity in combination with either the set of rules or the indication to the set of rules.

7. The method according to claim 6, wherein the subscription profile, prior to being created, is selected in accordance with the capability information of the subscriber entity in combination with either the set of rules or the indication to the set of rules.

8. The method according to claim 7, further comprising:
providing an indication to the mobile network operator entity, the indication specifying a subscription type according to which the subscription profile was selected.

9. The method according to claim 6, wherein the subscription profile type is selected from a set of subscription profile templates in accordance with the set of rules, or the indication to the set of rules.

10. The method according to claim 6, wherein the subscription profile type further is selected based on information obtained from the mobile network operator entity in the order.

11. The method according to claim 6, wherein the subscription profile type is selected by the subscription provisioning server providing data to a profile selection entity and receiving a profile specification in return from the profile selection entity, and wherein the subscription profile is created according to the profile specification.

12. The method according to claim 3, wherein the order specifies how the subscription profile type is to be selected.

13. The method according to claim 3, wherein the order pertains to a batch of subscription profiles to be created for a batch of subscriber entities.

14. A method for ordering a subscription profile for a subscriber entity, the method being performed by a mobile network operator entity, the method comprising:
providing, to a subscription provisioning server, an order for creating the subscription profile for the subscriber entity, wherein the order comprises a set of rules, or an indication to the set of rules, the set of rules pertaining to which types of subscription profile is to be created for the subscriber entity,
wherein the subscriber entity is verified to pass an eligibility check by the subscription provisioning server before, or as part of, creating the subscription profile, wherein the eligibility check is based on the capability information of the subscriber entity and pertains to whether the subscriber entity will support the subscription profile or not.

15. The method according to claim 14, wherein the order pertains to a batch of subscription profiles to be created for a batch of subscriber entities.

16. The method according to claim 14, further comprising:
obtaining an indication from a subscription provisioning server, the indication specifying a subscription type according to which the subscription profile was created by the subscription provisioning server.

17. The method according to claim 14, wherein the subscription provisioning server is a Subscription Manager Data Preparation, SM-DP+, entity.

18. The method according to claim 14, wherein the subscriber entity is: an embedded Universal Integrated Circuit Card, eUICC, entity, an integrated Universal Integrated Circuit Card, iUICC, entity, a European Telecommunications Standards Institute Smart Secure Platform, ETSI SSP.

19. A subscription provisioning server for creating a subscription profile for a subscriber entity, the subscription provisioning server comprising processing circuitry, the processing circuitry being configured to cause the subscription provisioning server to:
obtain, from the subscriber entity, a request for download of the subscription profile, the request comprising capability information of the subscriber entity;
create the subscription profile based on the capability information as obtained from the subscriber entity and in accordance with a set of rules received from a mobile network operator entity; and
verify that the subscriber entity passes an eligibility check before, or as part of, creating the subscription profile, wherein the eligibility check is based on the capability information of the subscriber entity and pertains to whether the subscriber entity will support the subscription profile or not.

20. A mobile network operator entity for ordering a subscription profile for a subscriber entity, the mobile network operator entity comprising processing circuitry, the processing circuitry being configured to cause the mobile network operator entity to:
provide, to a subscription provisioning server, an order for creating the subscription profile for the subscriber entity, wherein the order comprises a set of rules, or an indication to the set of rules, the set of rules pertaining to which types of subscription profile is to be created for the subscriber entity,
wherein the subscriber entity is verified to pass an eligibility check by the subscription provisioning server before, or as part of, creating the subscription profile, wherein the eligibility check is based on the capability information of the subscriber entity and pertains to whether the subscriber entity will support the subscription profile or not.

* * * * *